June 29, 1965 W. T. DOUGLAS, JR., ETAL 3,192,527
COMMAND OVERRIDE FOR RANDOM ACCESS DISCRETE ADDRESS SYSTEM
Filed Feb. 5, 1962
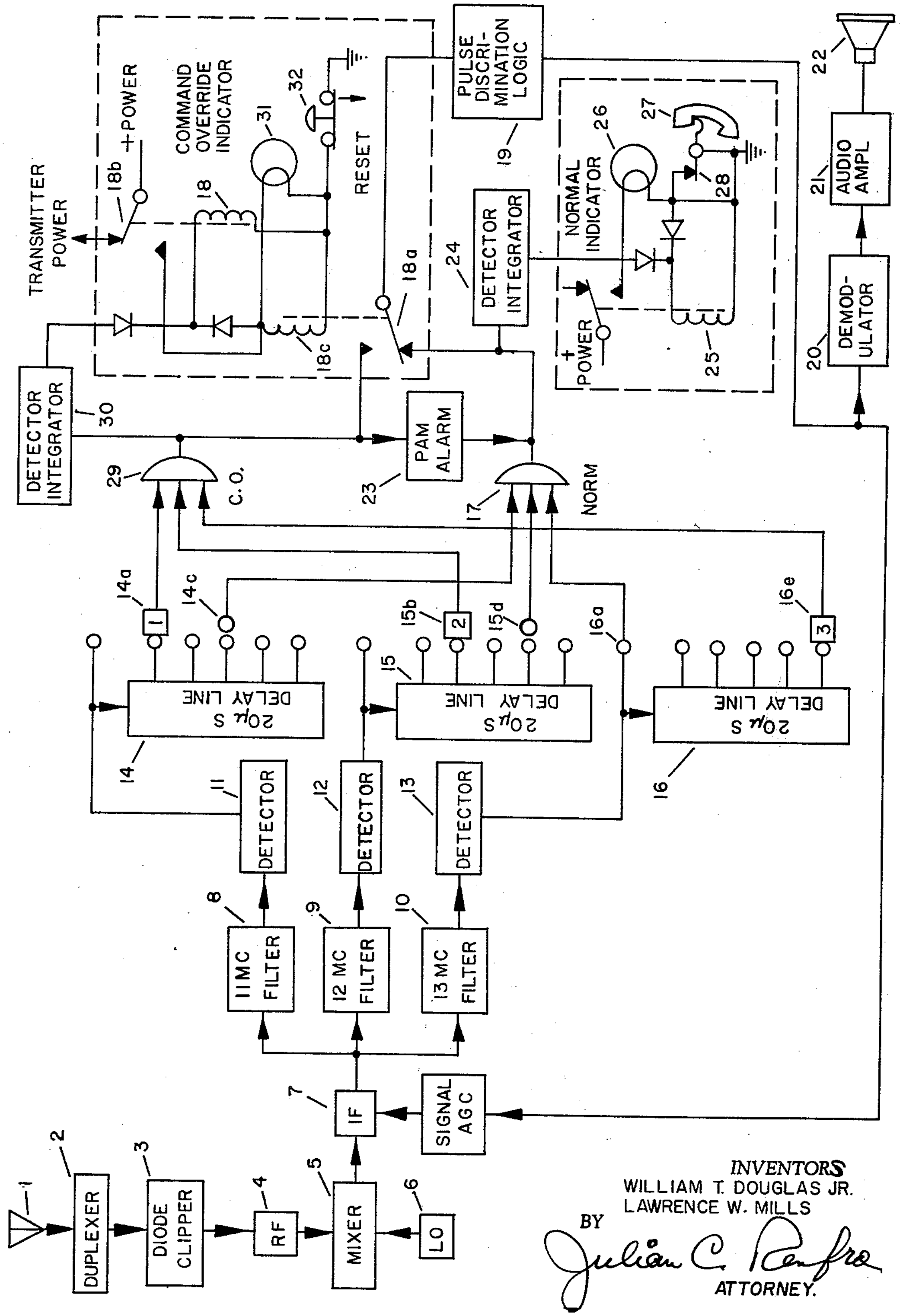
INVENTORS
WILLIAM T. DOUGLAS JR.
LAWRENCE W. MILLS
BY Julian C. Renfro
ATTORNEY.

3,192,527
Patented June 29, 1965

3,192,527

COMMAND OVERRIDE FOR RANDOM ACCESS DISCRETE ADDRESS SYSTEM

William T. Douglas, Jr., and Lawrence W. Mills, Orange County, Fla., assignors to Martin-Marietta Corporation, Middle River, Md., a corporation of Maryland Filed Feb. 5, 1962, Ser. No. 171,046
9 Claims. (Cl. 343—177)

This invention relates to an improvement in discrete address communication systems and more particularly to a system providing a command override operation for a discrete address communication system.

Recently, communication systems have been developed for communicating through a common radio frequency medium to a number of discrete locations. At any of these locations a particular message intended for that location will be received to the exclusion of all others. The transmitting station encodes the message in such a manner that it is received only by the addressed receiver. One example of such a communication system is shown and described in U.S. patent application Serial No. 107,194, filed May 2, 1961, entitled "Discrete Address Communication System with Random Address Capabilities" to the common assignee of this application. This invention is particularly directed to an improvement in the communication system disclosed in the previously mentioned patent application.

In a communication system in which a plurality of transmitters are each transmitting to any one of a plurality of receivers it is quite desirable that a command override emergency channel be provided by means of which one transmission may be used to reach all receivers within range. In such a system provisions must be made to overcome the difficulty of reaching all receivers even though the sensitivity of the receiver may be reduced by AGC action developed as a result of strong transmission signals from other transmitters. The command override feature should provide a particular code which, when transmitted, will cause all other transmitters to cease transmission, thereby clearing the air to allow a reliable message transmission which will be received by all receivers.

Accordingly, it is an important object of this invention to provide an improved discrete address communication system in which a transmitter having access to a particular command code can commence transmission of a message to all receivers in the system regardless of the fact that other transmitters in the system may already be transmitting.

It is a further object of the present invention to provide an improved communications system of the type utilizing both time and frequency coding which enables messages to be transmitted selectively between two or more stations in the system; the improvement comprising the provision of means for transmitting a command code which enables all receivers in the system to receive a particular message to the exclusions of all other messages.

It is a further object of the present invention to provide an improved communications system in which a transmitter having access to a particular command code can prevent all other transmitters in the system from transmitting while a command override message is transmitted to all receivers in the system.

In accordance with one embodiment of this invention, transmitters are provided for coding messages in a pulse position modulated code. The resultant pulses are further encoded in accordance with the particular receiver to which the message is to be sent. Each pulse in the pulse position code is converted to a plurality of pulses having a particular time-spacing and each of the time-spaced pulses enables an oscillator or signal gate producing a particular frequency pulse to be transmitted.

These transmitted pulses, encoded in a time-spaced and frequency selected manner, are received by all receivers within range. At the receiver a plurality of filters, each having a selected band pass, are provided to separate the pulses of the several frequencies which have been transmitted. The output of each filter is fed to a tapped delay line. An output is taken from a tap of the delay line chosen in accordance with the particular time-spacing of the pulses transmitted for that particular receiver. The outputs of the delay lines are connected to a coincidence gate which produces an output only when the pulse outputs of the delay line occur coincidentally in time. This occurs only when pulses having the particular time-spacing designed for that receiver have been transmitted. The output of the coincidence gate is fed to a demodulator which converts the pulse position modulated pulses back into audio.

What has been described above is the system which is the subject matter of the aforementioned patent application entitled "Discrete Address Communication System with Random Address Capabilities" filed May 2, 1961. This forms no part of the present invention which is directed to an improvement in this system. The improvement includes means at one or more transmitters for transmitting a command override code which enables all receivers within range to receive a message.

A second tap on each delay line of each receiver is connected to a second coincidence gate. The second taps are selected in accordance with the time-spacing of the command override code. These second taps are connected to a second coincidence gate. The output of this second coincidence gate is used to energize a relay which disconnects the output of the first coincidence gate from the demodulator. The relay connects the output of the second coincidence gate to the demodulator so that the command override message may be demodulated.

In order that other transmitters in the system will not transmit messages which may interfere with a command override message by decreasing the sensitivity of the receivers through AGC action, it is necessary to take all transmitters off the air except the transmitter transmitting the command override message. In order to do this, the power for the transmitter associated with each receiver is supplied through a normally closed set of contacts of the above-mentioned relay. When a command override message is received, the relay is actuated and the power is removed from the transmitter, thereby preventing it from interfering with the command override message.

These and other objects, advantages and features of the present invention may be obtained from the following more detailed description and appended claims together with the single drawing which shows a block diagram of the receiver of this invention.

Referring to the receiver shown in block form in the drawing, the receiver pulses are connected from antenna 1, through duplexer 2, to the diode clipper 3. The RF amplifier 4, mixer 5, local oscillator 6, and IF amplifier 7 complete the receiver circuitry. In order to decode the time-spacing and frequency coded pulses, the remainder of the circuitry in the drawing is provided.

The received signal is divided into its component frequency pulses by the filters 8, 9 and 10. In the embodiment shown, filters having a band pass of 11 megacycles, 12 megacycles and 13 megacycles are used. It will be understood that the number and band pass of these filters is varied in accordance with system requirements. The output of each filter is detected in detectors 11, 12 and 13, the outputs each of which are connected to an associated delay line 14, 15, and 16.

In order to decode normal messages, particular taps of each delay line are connected to the coincidence gate 17. The tap 14*c*, the tap 15*d* and the tap 16*a* are connected to coincidence gate 17 for this purpose. The taps of each delay line produce outputs delayed from the input by specific intervals of time. It is not necessary that all of the pulses in a message be delayed. The pulse appearing last in time may be undelayed as is the case with the output of detector 13 which passes through the tap 16*a* undelayed. The tap 14*c* produces the output of detector 11 delayed by three increments of time; the tap 15*d* produces the output of detector 13 delayed by four increments of time; and the tap 16*a* produces the output of detector 13 undelayed. When a pulse intended for this particular receiver has been coded and transmitted, pulses appear coincidentally on the taps 14*c*, 15*d* and 16*a*, thereby producing a pulse output from coincidence gate 17. This pulse is connected through the switch 18*a* of the relay 18, through pulse discrimination logic 19 to the demodulator 20. The demodulator 20 demodulates the pulse position modulated codes and feeds audio amplifier 21 which drives the speaker 22.

The output of coincidence gate 17 is also connected to the alarm 23. The alarm is provided to call the operator to the receiver when a message is to be transmitted to that receiver. The transmitter transmits, for example, a pulse amplitude modulated code which is detected by the alarm 23. Any other identifiable signal, such as a particular frequency, may be used to activate the alarm. Since the caller identifies himself immediately after ringing, a normal detector integrator 24 is provided to recognize the presence of voice modulated pulses and to energize the relay at 25. This relay is wired as a latching relay and lights the indicator 26 until the circuit is opened by lifting the handset 27 which opens switch 28. This circuitry enables the operator to know that his call is coming in on his normal address, or to know he was called on his normal address if he was not present to hear the alarm, and to know whether he is receiving a normal call or a command override call.

The circuitry just described is involved in receiving and decoding normal messages. In order to decode a command override message, the taps 14*a*, 15*b* and 16*e* are connected to a second coincidence gate 29. The taps of the delay lines which are connected to this second coincidence gate are chosen in accordance with the particular command override code which is to be used.

In order to prevent pulse actuation of the command override relay 18 by noise pulses, a detector integrator 30 is provided. This integrates the first pulse outputs of the coincidence gate 29 and only after a suitable number of pulses are received will the relay 18 be actuated. Actuation of relay 18 switches contact 18*b* from its normally closed to its normally open position. Power is supplied through contact 18*b* to energize winding 18*c* which switches contact 18*a*. This interrupts the connection of coincidence gate 17 to the demodulator and connects coincidence gate 29 through the contacts 18*a* to the demodulator. By this means, command override messages will now be decoded instead of normal messages.

Energization of relay 18 switches contact 18*b* from its normally closed position to its normally open position so as to interrupt the supply of power which is normally supplied to the transmitter through the normally closed contact 18*b*. Power is supplied to the normally open contact and this latches the relay and lights the indicator lamp 31. When the command override message is terminated, it is necessary to press the reset button 32 which interrupts the supply of power to the holding winding and returns relay 18 to its normal condition.

In a system such as this, it would be easy to jam the system if a jammer determined the command override code. If this happens, jamming can be prevented by locking the reset button 32 in the open position. This disables the command override system until a new command override code can be obtained.

The operation of the system is as follows. A normal message is transmitted to the receiver by pulses having I.F. frequencies with the following time spacings. The I.F. pulse at 13 megacycles occurs last in time. The I.F. pulse at 12 megacycles occurs four increments of time before the occurrence of the 13 megacycles pulse and the pulse at 11 megacycles occurs three increments of time before the occurrence of the 13 megacycle pulse. When these pulses have this time spacing, pulses appear coincidently in time at the input to coincidence gate 17. This produces a single pulse output from coincidence gate 17 which forms one pulse in a pulse position modulated code message for that receiver.

A command override message includes pulses having I.F. frequencies of 11 megacycles, 12 megacycles and 13 megacycles with the following spacings. The pulse at 11 megacycles occurs last in time. The pulse at 12 megacycles precedes the pulse at 11 megacycles by one increment of time and the pulse at 13 megacycles precedes the pulse at 11 megacycles by four increments of time. When pulses having this time spacing are transmitted, pulses appear at the inputs to coincidence gate 29 coincidently in time. This produces a single pulse output at the coincidence gate 29. The occurrence of a small number of such command override pulses actuates the command override relay 18, thereby opening the contact 18*b* to remove the transmitter power from the transmitter. This prevents the transmitter from transmitting a message to another receiver in the system which may be such a strong signal as to decrease the sensitivity of that receiver by AGC action and prevent that receiver from receiving the command override message. The command override relay 18 also switches the contact 18*a* thereby switching the output of coincidence gate 29 to the pulse discrimination logic 19 and demodulator 20. When this happens, the pulse position modulated command override message is demodulated.

While a specific embodiment of this invention has been shown and described, it will, of course, be understood that various modifications may be made without departing from the principles of the invention. The appended claims are therefore intended to cover any such modifications within the true spirit and scope of the invention.

I claim:

1. An improvement in a communication system of the type wherein each transmitter includes means for generating position modulated pulses from input intelligence, means for address coding said pulses into groups of signals intended for a particular receiver using a plurality of carrier frequencies and a plurality of predetermined relative timed separated signals, means for transmitting said signals to at least one receiver, and wherein each receiver includes means for detecting signals at the several frequencies, means for recognizing the particular relative times of occurrences of the signals intended for that receiver, means for converting the recognized signals into position modulated pulses, means for converting said last positioned modulated pulses into electrical waves representative of the input intelligence, said improvement comprising a decoder at each receiver for recognizing a particular common address coding of said pulses, switching means responsive to said decoder, said switching means serving to disconnect said means for recognizing signals intended for the receiver from the means for converting recognized signals into position modulated pulses and serving to connect said decoder to the means for converting recognized signals into position modulated pulses.

2. The system recited in claim 1 wherein said switching means is a relay, said relay having an actuating winding, a normally open set of contacts and a normally closed set of contacts, said means for recognizing signals intended for the receiver being connected through said normally closed contacts to said means for converting recognized signals into position modulated pulses, said decoder being connected through said normally opened contacts to said means for converting recognized signals into position modulated pulses, said decoder being connected to energize said actuating winding.

3. An improvement in a discrete address duplex radio telephone system of the type utilizing time and frequency coding comprising a plurality of transmitter and receiver units, each of said transmitter units having means for converting audio information into position modulated pulses, means for address coding said pulses into a plurality of pulses occurring at different times, latter means placing said several pulses in prearranged time sequence representative of a specific intended receiver, means for modulating said several pulses on several radio frequency carriers, means for combining the several frequencies into a single radio frequency channel for impressing upon an antenna for radiation as electromagnetic waves, receiver means for separating the plurality of frequencies into individual channels, means for detecting the pulses in each channel, means for delaying those pulses which occurred earliest until all pulses coincide in time with each other, first means for combining the resultant pulses into one pulse, means for converting these pulse position modulated pulses into electrical voltages representative of audio information input to said transmitter, and means for converting latter voltages into acoustic energy, said improvement comprising means for transmitting a particular common address coding of said pulses, second means at each receiver for delaying the pulses in said common address code until all pulses coincide in time, means for combining the outputs of said second delay means into a single pulse, switching means at each receiver responsive to said last named combining means, said switching means serving to disconnect said first means for combining said resultant pulses from said means for converting the pulse position modulated pulses into electrical voltages and serving to connect said second combining means to said means for converting pulse position modulated pulses into electrical voltages.

4. The system recited in claim 3 wherein said switching means includes a relay, said relay having an actuating winding, a first normally closed set of contacts, a second normally closed set of contacts, and a normally open set of contacts, said first means for combining said resultant pulses into one pulse being normally connected through said first normally closed set of contacts to said means for converting pulse position modulated pulses into electrical voltages, said second means for combining said resultant pulses being connected through said normally open set of contacts, to said means for converting pulse position modulated pulses into electrical voltages, a source of power for each of said transmitters, said power source being connected through said second normally closed set of contacts to the transmitter associated with that particular receiver.

5. An improvement in a communication system of the type wherein each transmitter includes means for generating position modulated pulses from input intelligence, means for address coding said pulses into groups of signals intended for a particular receiver using a plurality of carrier frequencies and a plurality of predetermined relative timed separated signals, means for transmitting said signals to at least one receiver, and wherein each receiver includes means for detecting signals at the several frequencies, means for recognizing the particular relative times of occurrences of the signals intended for that receiver, means for converting the recognized signals into position modulated pulses, means for converting said last position modulated pulses into electrical waves representative of the input intelligence, said improvement comprising a decoder at each receiver for recognizing a particular common address coding of said pulses, switching means responsive to said decoder, said switching means serving to disconnect said means for recognizing signals intended for the receiver from the means for converting recognized signals into position modulated pulses and serving to connect said decoder to the means for converting recognized signals into position modulated pulses, and means at each receiver responsive to the output of said decoder for disabling said means for transmitting said signals at all transmitters except the transmitter which is transmitting said common address coding of said pulses.

6. An improvement in a receiver of the type adapted to receive and decode messages which are pulse coded in a time-spacing and selected frequency manner, said receiver including filter means for separating said received pulses in accordance with their frequencies, a plurality of tapped delay devices each receiving the output of one of said filters, a first coincidence gate, a particular tap of each delay device being connected to said first coincidence gate, the particular tap of each delay device being selected in accordance with the address of that particular receiver, the output of said coincidence gate being pulses making up the pulse code of a message transmited to that particular receiver, and means for converting said pulse code to a message, said improvement comprising a second coincidence gate, second selected taps on each of said delay devices being connected to said second coincidence gate, said second taps being selected in accordance with a common command override code which is received and decoded by a plurality of receivers, switching means responsive to said second coincidence gate, said switching means serving to disconnect said first coincidence gate from said means for converting pulse codes to messages and serving to connect said second coincidence gate to said means for converting pulse codes to messages.

7. The system recited in claim 6 wherein said switching means includes a relay, said relay having an actuating winding, a normally open set of contacts, a first normally closed set of contacts, and a second normally closed set of contacts, the output of said second coincidence gate being connected to energize said actuating winding, the output of said first coincidence gate being connected through said first normally closed set of contacts to said means for converting pulse codes to messages, the output of said second coincidence gate being connected through said normally open set of contacts to said means for converting pulse codes to messages, a source of power for a transmitter associated with said receiver, said source of power being connected to said transmitter through said second set of normally closed contacts.

8. The system recited in claim 6 and an integrator, said second coincidence gate being connected to said actuating winding through said integrator, said integrator serving to energize said winding only when a number of pulses have been received from said second coincidence gate whereby the actuation of said relay by noise pulses is prevented.

9. An improvement in a communications system involving a plurality of transmitters and receivers wherein each transmitter includes means for generating position modulated pulses from input intelligence, each of said transmitters including means for address coding said pulses into groups of signals intended for any particular receiver utilizing a plurality of carrier frequencies and a plurality of predetermined relative timed separated signals, means for transmitting said signals to at least one of said receivers, at least one of said transmitters including means for generating position modulated pulses representing a command override message to be received by a plurality of receivers associated with said transmitters, and wherein each receiver of the system includes means for detecting signals at the several frequencies, means in each receiver for recognizing the particular relative times of the occurrences of the group of signals intended for that receiver and for converting recognized signals into position modulated pulses, means for converting said position modulated pulses into electrical waves representative of the input intelligence, and additional means at each receiver for recognizing the address coding of a command override message, and switching means at each receiver responsive to the receiving of a command override message by said additional means, each of said switching means serving to disconnect the first mentioned recognition means, and to connect in its stead said additional means to the means for converting recognized signals into position modulated pulses, each of said switching means also preventing during the duration of a command override message the transmission of signals from its associated transmitter except for the transmitter which is transmitting such command override message.

References Cited by the Examiner

UNITED STATES PATENTS

| | | | |
|---|---|---|---|
| 2,449,819 | 9/48 | Purington | 325—51 |
| 2,501,986 | 3/50 | Brockman | 325—57 |
| 2,530,957 | 11/50 | Gilman | 343—203 |
| 2,955,279 | 10/60 | Bode | 340—167 |

DAVID G. REDINBAUGH, *Primary Examiner.*